United States Patent [19]

Fitzgerald

[11] Patent Number: 4,470,566
[45] Date of Patent: Sep. 11, 1984

[54] PLUG-TYPE AIRCRAFT DOOR ACTUATING MECHANISM

[75] Inventor: James T. Fitzgerald, Mercer Island, Wash.

[73] Assignee: The Boeing Company, Seattle, Wash.

[21] Appl. No.: 448,888

[22] PCT Filed: Aug. 20, 1982

[86] PCT No.: PCT/US82/01127
§ 371 Date: Aug. 20, 1982
§ 102(e) Date: Aug. 20, 1982

[87] PCT Pub. No.: WO84/00786
PCT Pub. Date: Mar. 1, 1984

[51] Int. Cl.³ ................................................ B64C 1/14
[52] U.S. Cl. ............................ 244/129.5; 244/137 P; 244/129.1; 292/5; 292/201; 292/336.3
[58] Field of Search ............... 292/336.3, 144, 5, 201, 292/214, 217, DIG. 31, DIG. 62; 244/118.5, 129.4, 129.5, 137 R, 137 P, DIG. 2

[56] References Cited

U.S. PATENT DOCUMENTS

| | | | |
|---|---|---|---|
| 2,833,582 | 5/1958 | Henrichs | 292/336.3 |
| 4,125,235 | 11/1978 | Fitzgerald et al. | 244/DIG. 2 |
| 4,225,164 | 9/1980 | Wensley et al. | 292/144 |
| 4,312,153 | 1/1982 | Parkinson et al. | 244/129.5 |

FOREIGN PATENT DOCUMENTS 104705 8/1938 Australia .............................. 292/214

Primary Examiner—Trygve M. Blix
Assistant Examiner—Rodney Corl
Attorney, Agent, or Firm—Hughes, Barnard & Cassidy

[57] ABSTRACT

Actuating mechanisms (106 and 122) for latching and unlatching an aircraft plug-type door (50) which is laterally and vertically translatable along tracks (55, 56 and 60) for movement into and out of an ingress/egress door opening (51) formed in the aircraft fuselage (52) and vertically along a path following the interior contour of the fuselage (52). The interior actuating mechanism (106) includes an interior door handle (99) mounted in the fuselage (52) adjacent the ingress/egress opening (51) and swingable between first and second positions, with the interior door handle (99) being operably associated with locking means (119, 120) for locking the door (50) upon closure thereof and for unlocking the door (50) preparatory to opening thereof. The external actuating mechanism (122) includes an exterior door handle (124) mounted in and flush with the fuselage (52) adjacent the ingress/egress opening (51) and swingable between first and second positions, with the exterior actuating mechanism (122) being normally disassociated with the interior actuating mechanism (106) so as to permit independent interior manipulation of the latter. Means (126, 134) are provided which are accessible only from the exterior of the aircraft for operatively associating the exterior door handle (124) with the interior door handle (99) and slaving the two together so as to permit door locking and unlocking from the exterior of the aircraft. The aircraft includes an emergency escape slide normally stowed within and carried by the door (50), and means (70, 75) for arming the emergency evacuation system to attach the escape slide to the passenger deck (74) and for disarming the system so that the escape slide is attached to the door (50). Locking means (89, 91, 94 and 95) are provided for releasably but positively locking the escape slide to the door (50) when the emergency evacuation system is disarmed. The door (50) may be opened from the interior of the aircraft with the emergency evacuation system armed or disarmed. Means (126, 141) are provided on the exterior of the aircraft for automatically disarming the emergency evacuation system perparatory to opening the door (50) from the exterior of the aircraft.

7 Claims, 21 Drawing Figures

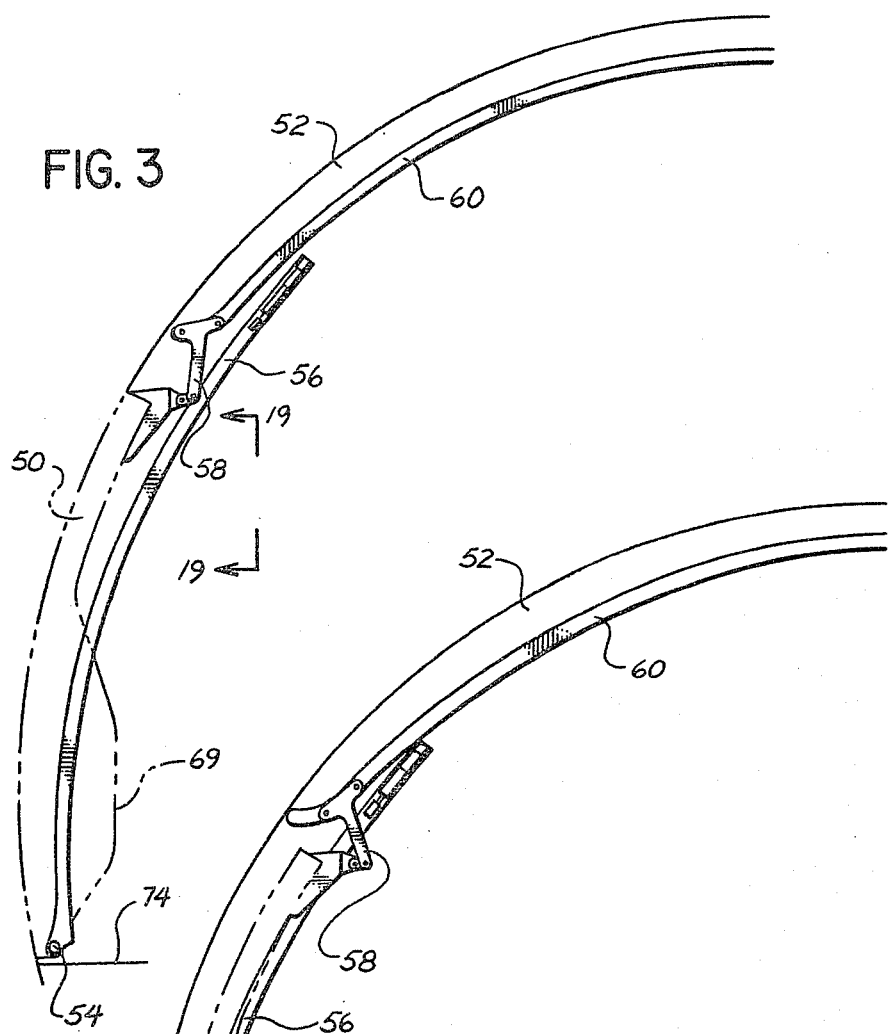

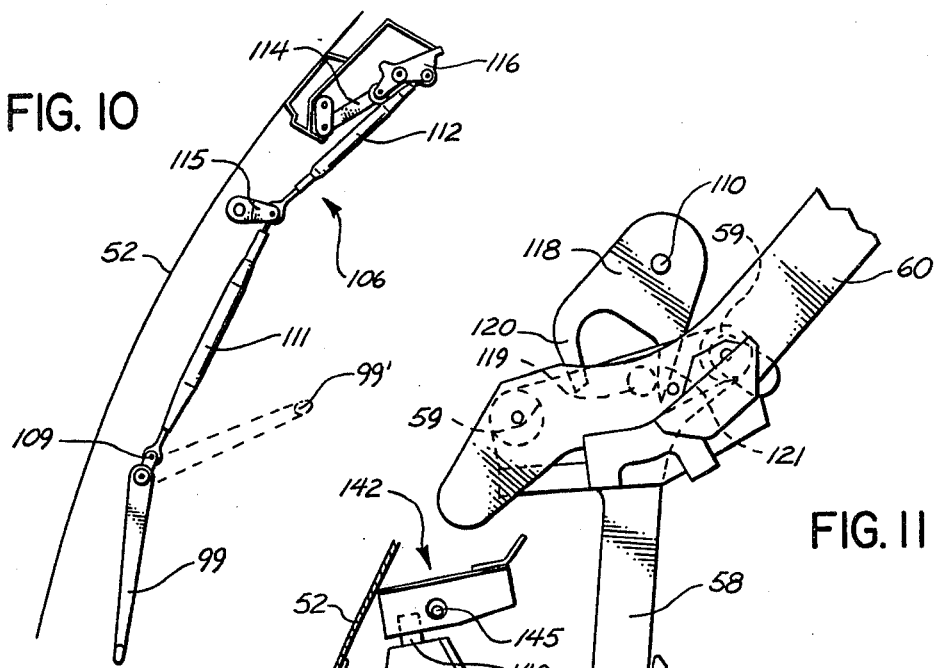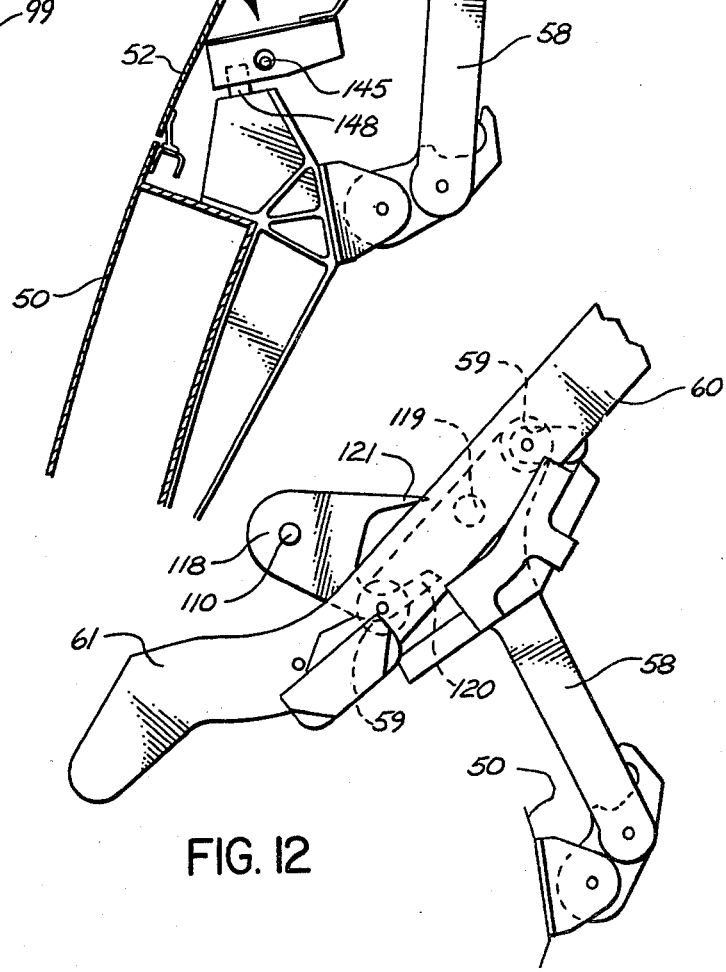

PLUG-TYPE AIRCRAFT DOOR ACTUATING MECHANISM

BACKGROUND OF THE INVENTION

1. Technical Field

The present invention relates generally to plug-type aircraft doors; and, more particularly, to improved actuating mechanisms for: (i) latching and unlatching such doors from both the interior and exterior of the aircraft; (ii) arming and disarming the escape slide deployment mechanism from the interior of the aircraft; and (iii), automatically disarming the escape slide deployment mechanism when the plug-type aircraft door is being opened from the exterior of the aircraft. In accordance with the invention, the actuating mechanisms for latching and unlatching the plug-type aircraft door are designed such that the interior and exterior actuating door handles are slaved together only when the door is to be opened from the exterior of the aircraft. However, when the door is to be opened from the interior of the aircraft, the interior and exterior actuating handles are not slaved to one another for simultaneous pivotal movement, thereby insuring that under emergency conditions when it is necessary to open an armed door and deploy the escape slide, movement of the interior actuating handle from the door latched position to the door unlatched position is not accompanied by simultaneous pivotal movement of the the exterior door handle; but, rather, the exterior handle remains flush with the outer skin of the aircraft fuselage where it cannot interfere with slide deployment and/or damage the slide during deployment.

2. Background Art

Conventional commercial airplanes are commonly provided with a multiplicity of ingress and egress openings in the aircraft fuselage with suitable doors being provided for closure of such openings. The doors vary widely in terms of their construction and operation. Commonly such doors are plug-type doors which are designed to fit into the opening when the doors are closed so as to form a substantially smooth continuous uninterrupted exterior skin surface. When such plug-type doors are opened, they move inwardly and upwardly into the aircraft fuselage and slide upwardly along tracks deployed on the interior of the fuselage with the door being received within the compartment immediately above the ceiling in the passenger cabin. In some instances, the doors are electrically operated; whereas in other instances, the doors are manually operated. However, most commercial air carriers today are reluctant to rely upon electrical actuating systems and therefore, insist that passenger doors be designed for manual operation.

Moreover, as is well known to those skilled in the art, commercial passenger airplanes are required to carry emergency evacuation equipment including escape slides that are associated with one or more of the ingress and egress openings in the aircraft fuselage. Commonly the escape slides are stowed within the plug-type doors and are designed to move with the doors when the slide deployment system is disarmed. When the slide deployment system is armed, the escape slides stowed within the doors are automatically attached to the passenger deck adjacent the fuselage opening. As a consequence, when the door is opened under emergency conditions while the emergency evacuation equipment is armed, as the door moves upwardly the slide (which is now affixed to the passenger deck) is withdrawn from the door and deployed.

The present invention relates to improvements in actuating mechanisms for manually operable plug-type aircraft doors of the foregoing character. An existing and known door construction and actuating apparatus therefor is disclosed in U.S. Pat. No. 4,125,235-Fitzgerald et al. The existing construction disclosed in that patent involves a plug-type aircraft door of the foregoing character having an escape slide normally stowed therein and wherein the door is designed to be manually raised and lowered. The actuating mechanisms for latching and unlatching the aircraft door from both the interior and exterior of the aircraft, together with the arming mechanisms, are mounted in the fuselage structure surrounding the door opening as opposed to being mounted within the door itself. As there described in greater detail, the interior and exterior door handles are slaved together for movement in unison irrespective of which handle is employed to latch or unlatch the door. Thus, when the aircraft door is unlatched from the interior of the aircraft, the exterior door handle pivots outwardly from its stowed position flush with the aircraft's exterior skin and, unfortunately, such movement represents an undesired hazard if the door is being opened under emergency conditions where the escape slide is to be deployed.

SUMMARY OF THE INVENTION

Latching/unlatching and arming/disarming actuating mechanisms are disclosed for manually operable plug-type aircraft doors of the type employing deployable emergency evacuation equipment in the form of escape slides stowed in the doors wherein: (i) the actuating mechanisms are positioned entirely within and on the fuselage structure surrounding the ingress/egress opening in the fuselage; (ii) the door may be latched and unlatched and the deployable emergency evacuation equipment armed and disarmed from the interior of the aircraft whithout movement of the exterior door handle; and (iii), the door may be disarmed, unlatched and relatched from the exterior of the aircraft. The arming/disarming mechanism for the deployable emergency evacuation equipment is designed such that when in the disarmed state, the deployable escape slide is stowed within the door and the girt bar carrier associated therewith is positively clamped to the door assembly; yet, when armed, the girt bar carrier is released or disconnected from its attachment to the door and is, instead, positively attached to the passenger deck adjacent the ingress/egress opening in the fuselage so that when the door is opened and moved upwardly under emergency conditions—i.e., when the system is armed—the positive latching of the grit bar carrier to the passenger deck causes the escape slide to be withdrawn from its stowed position within the upperwardly receding door and deployed through the ingress/egress opening for emergency evacuation purposes. The door's latching/unlatching mechanism is further provided with an additional secondary latching means for positively latching the door in the closed position with such secondary latching means being electrically coupled to a warning system in the cockpit for providing the pilot with a remote visual or auditory indication as to the latched or unlatched state of the door; yet, wherein the positive secondary latching mechanism may be visually inspected from the interior of the aircraft at any time to verify whether the door is, in fact, positively latched in the event that the remote cockpit warning system provides an indication that the door is unlatched—an indication that can result from an electrical malfunction. Finally, because of the simplicity of the actual door construction itself, the ability to maintain close manufacturing tolerances has been substantially enhanced, thereby permitting incorporation of continuous door stops for carrying pressure loads.

More specifically, it is a general aim of the present invention to provide improved latching/unlatching and arming/disarming actuating mechanisms for a vertically movable plug-type aircraft door of the type employing a deployable emergency evacuation escape slide stowed in the door and which readily permit the door to be latched and unlatched-and, therefore, opened and closed-from both the interior and the exterior of the aircraft; yet wherein the interior and exterior door handles are disconnected from one another under all operating conditions except when the door is being unlatched from the exterior of the aircraft. As a consequence of attaining this objective, it is possible to unlatch and open the door, or close and latch the door, from the interior of the aircraft irrespective of whether the emergency evacuation equipment is armed or disarmed without any movement of the exterior door handle from its stowed inoperative position flush with the aircraft's external skin. Yet, at the same time, the improved actuating mechanism permits the door to be unlatched and opened from the exterior of the aircraft in an operation which automatically and positively disarms the deployable emergency evacuation system.

In another of its important aspects, it is an object of the invention to provide an improved actuating mechanism for latching and unlatching vertically movable plug-type aircraft doors which includes a secondary positive latching mechanism for securely latching the door in the fully closed position and which, through suitable limit switches or the like, provides a visual and/or auditory remote cockpit warning system indicative of the door's latched or unlatched state; yet, wherein the secondary positive latching mechanism can be easily visually observed from the interior of the aircraft to verify whether the door is, in fact, latched or unlatched should the cockpit warning system provide a warning that the door is unlatched, thereby averting problems due to possible electrical malfunctions in the latch/unlatch warning system.

It is a further and more detailed objective of the invention to provide a vertically movable plug-type aircraft door of the foregoing character wherein the girt bar carrier associated with the deployable emergency evacuation equipment is positively affixed to the passenger deck when the system is armed but, when the system is disarmed, is disconnected from the passenger deck and supported by, and carried by, the door for movement therewith; yet, wherein the grit bar carrier is positively clamped to the door in the disarmed state so as to permit movement of the girt bar carrier assembly with the door under disarmed conditions while simultaneously preventing accidental dislodgement of the grit bar carrier assembly from the door.

The simplicity of the latching/unlatching and arming/disarming actuating mechanisms and the location of essentially all operating parts thereof in the fuselage structure surrounding the ingress/egress opening in the fuselage permits the door—which is comprised essentially of a series of beams and an outer skin—to be machined to extremely close tolerances, particularly in the regions of the door edges. Accordingly, in another of its more detailed aspects, it is an object of the invention to take advantage of such close tolerance door edges and provide continuous mutually engageable door stop elements on the door edges and the adjacent edges of the fuselage structure defining the ingress/egress opening so as to effectively carry pressure loads.

DESCRIPTION OF THE DRAWINGS

These and other objects and advantages of the present invention will become more readily apparent upon reading the following detailed description and upon reference to the attached drawings, in which:

FIG. 3 is a fragmentary interior elevational view of a plug-type door and actuating mechanism therefor constructed in accordance with the present invention with the door here being shown in the fully closed latched position and with the interior cabin walls or linings having been removed to expose the operating linkages in the fuselage surround structure—i.e., the fuselage structure surrounding the door opening, with the latter here being shown in phantom;

FIG. 3 is a fragmentary, simplified, vertical cross-sectional view taken substantially along the line 3—3 in FIG. 1, with parts removed for purposes of clarity, here depicting the vertically movable plug-type door in its fully down and closed latched position;

FIG. 4 is a fragmentary simplified vertical cross-sectional view similar to FIG. 3, but here illustrating the plug-type door in the slightly open position occupied just prior to closure or just after opening, and depicting the lower edge of the door as being displaced somewhat inwardly and upwardly by movement of the door rollers in the side tracks and with the upper edge of the door having been displaced inwardly to a greater extent and having moved slightly upward by movement of the door trolley in the upper track, whereby the door is in position to move freely into and upwardly out of the passenger cabin along the inner contour of the fuselage;

FIG. 10 is a fragmentary highly simplified vertical cross-sectional view here illustrating the latching/unlatching mechanism linkage with parts removed for purposes of clarity and with the internal latch handle in the door latched position;

FIG. 11 is a greatly enlarged vertical sectional view taken substantially along the line 11—11 in FIG. 1, here illustrating details of the latch cam assembly with the door being depicted in the latched and closed position and with movement of the door trolley in its track being precluded by the latch cam;

FIG. 12 is a view similar to FIG. 11, but here illustrating the position of the latch cam and door trolley assembly with the door in the unlatched position either leaving or approaching the fully closed position—i.e., with the door in a position such as that shown in FIG. 4;

Figure 1:
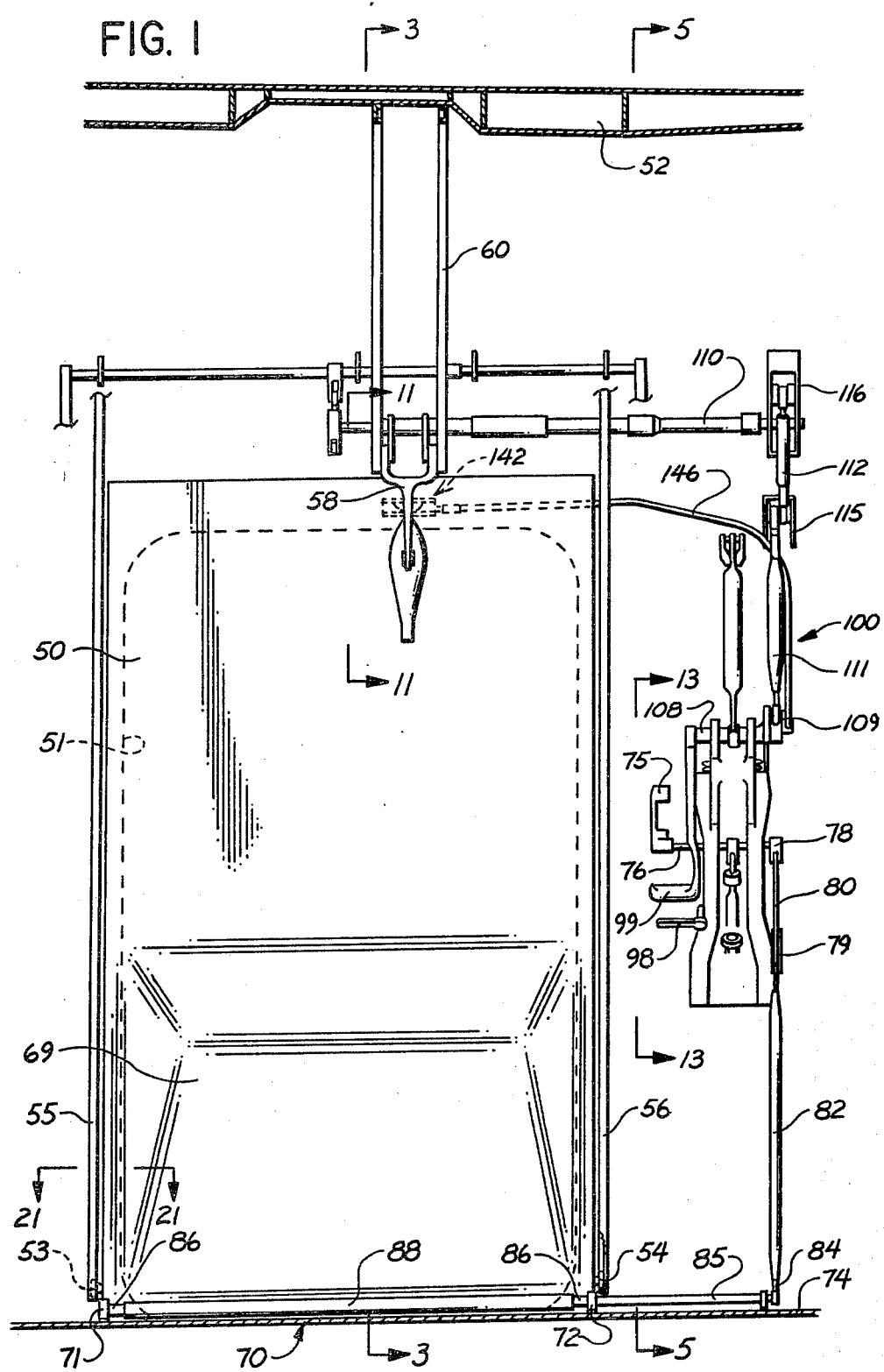

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as expressed in the appended claims.

DETAILED DESCRIPTION

Environment Of The Invention

Referring first to FIGS. 1 through 4 conjointly, there has been illustrated a vertically movable, manually operated plug-type door 50 of the type adapted to fit into and close a door ingress/egress opening, shown in broken lines at 51 in FIG. 1, formed in the fuselage 52 of an otherwise conventional commercial aircraft. As here depicted, and as more fully described in the aforesaid Fitzgerald et al. U.S. Pat. No. 4,125,235, such doors commonly employ a pair of door rollers 53, 54 mounted on the lower aft and forward door edges respectively, with such rollers being received in aft and forward vertically extending lower tracks 55, 56 respectively mounted on the fuselage surround structure adjacent the aft and forward edges of the door opening 51. The door assembly is further provided with a trolley 58 which is pivotally attached to the upper edge of the door 50 and is provided with a plurality of door rollers 59 (best shown in FIGS. 11 and 12) positioned to be received and ride in an upper track 60 which extends from the region adjacent the upper edge of door opening 51 inwardly and outwardly, generally following the interior contour of the aircraft fuselage 52 and extending into the compartment located above the ceiling panels (not shown) in the passenger cabin.

Figure 2:
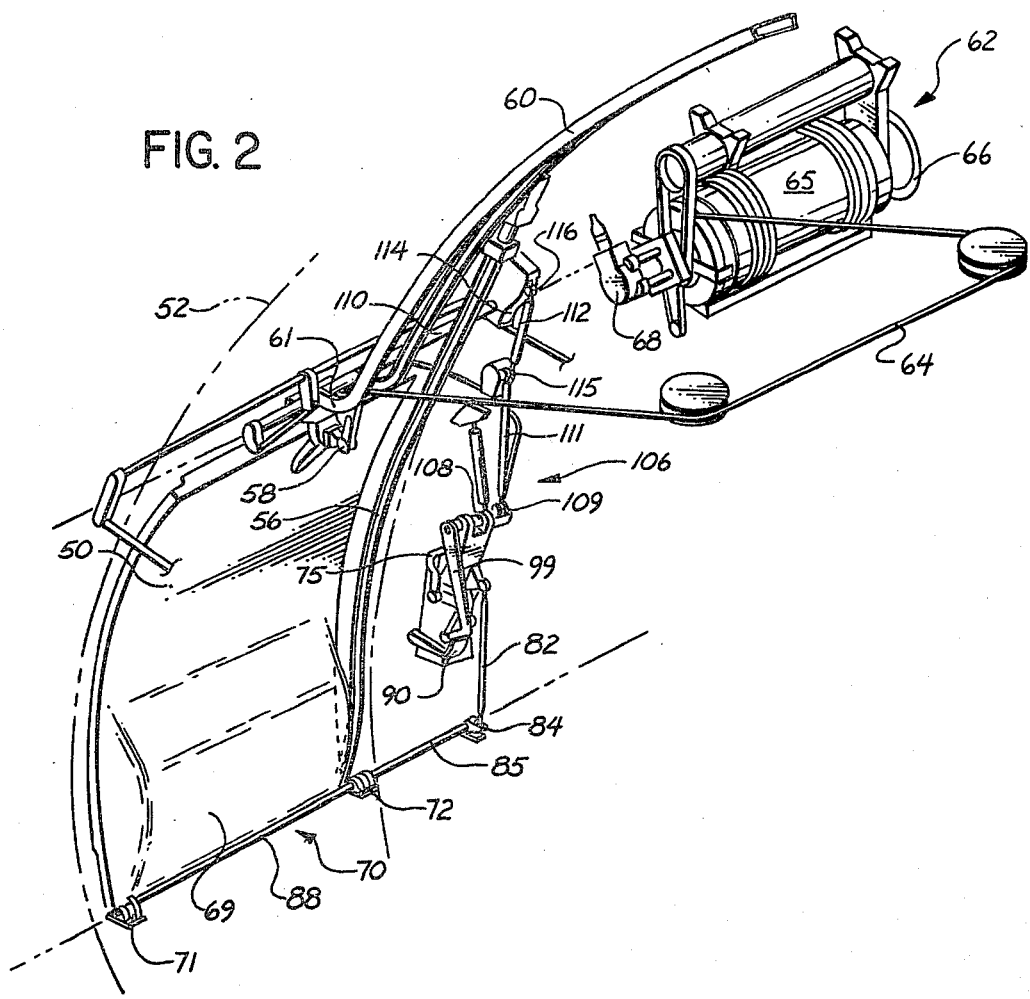
FIG. 2 is a perspective view from the interior of the aircraft with the cabin walls and fuselage being shown in phantom, here particularly depicting one of the two lower tracks and the upper track within which the plug-type door moves vertically, the counterbalance system associated therewith, and the latching/unlatching and arming/disarming actuating mechanisms and linkages.

As is conventional with this type of plug-type door closure 50, the two lower tracks 55, 56 and the upper track 60 are shaped so that when the door is manually operated by grasping the same and urging the door inwardly and upwardly, the lower door rollers 53, 54 move slightly inwardly and upwardly along their respective tracks 55, 56 so as to cause the door 50 to move inboard and away from the fuselage surround structure. At the same time, and as best illustrated in FIG. 2, it will be noted that the lower end of the upper track 60 extends inwardly at 61 before turning and extending upwardly along the interior fuselage contour. As a consequence of this construction, when the door 50 is opened, there is considerably greater inward movement of the upper edge of the door 50, thereby insuring that the door moves inboard a sufficient distance to fully clear the fuselage surround structure during upward movement. The foregoing inward and upward movement of the door 50 during opening thereof is more clearly illustrated by comparison of FIG. 3 (where the door 50 is shown in the fully closed position) with FIG. 4 (where the door 50 is shown in a slightly inboard and upward position such as would be occupied at an instant after door opening or, for that matter, at an instant prior to fully door closure during downward movement of the door 50).

In order to permit of ease in manual raising or lowering of the relatively heavy plug-type door 50, the door's trolley 58 is preferably coupled to a suitable counterbalance system, generally indicated at 62 in FIG. 2, by suitable cable mans 64 secured at one end to, and wound about, a counterbalance drum 65, with the opposite end of the cable means 64 being secured directly to the trolley 58. The cable means 64 may take the form of a single cable; or, if desired, a pair of parallel cables (not shown) may be provided with one cable being active at all times and the other cable being redundant so as to provide a suitable backup in the event of cable failure. Such a counterbalance system 62 is commonly provided with a hand wheel 66 to permit rigging of the system during installation and maintenance; and, if desired, may be provided with a conventional reversible power drive unit 68 to permit optional electrical operation of the door 50 during opening and closing thereof.

Moreover, those skilled in the art will appreciate that conventional passenger airplanes are required to carry emergency evacuation equipment which most commonly takes the form of evacuation or escape slides (not shown) that are normally stowed within an escape slide bustle 69 (FIGS. 1-4) on the door. In such an arrangement, the escape slide is secured to a girt bar and carrier assembly, generally indicated at 70, which is, in the unarmed state, carried by the door 50 for movement therewith; but which, in the armed state, is disconnected from the door 50 and physically attached to aft and foreward fittings 71, 72 respectively secured to the passenger deck 74 (FIG. 1) adjacent the lower ends of respective ones of the aft and forward lower tracks 55, 56.

Evacuation System-Internal Arming/Disarming

Figure 5:
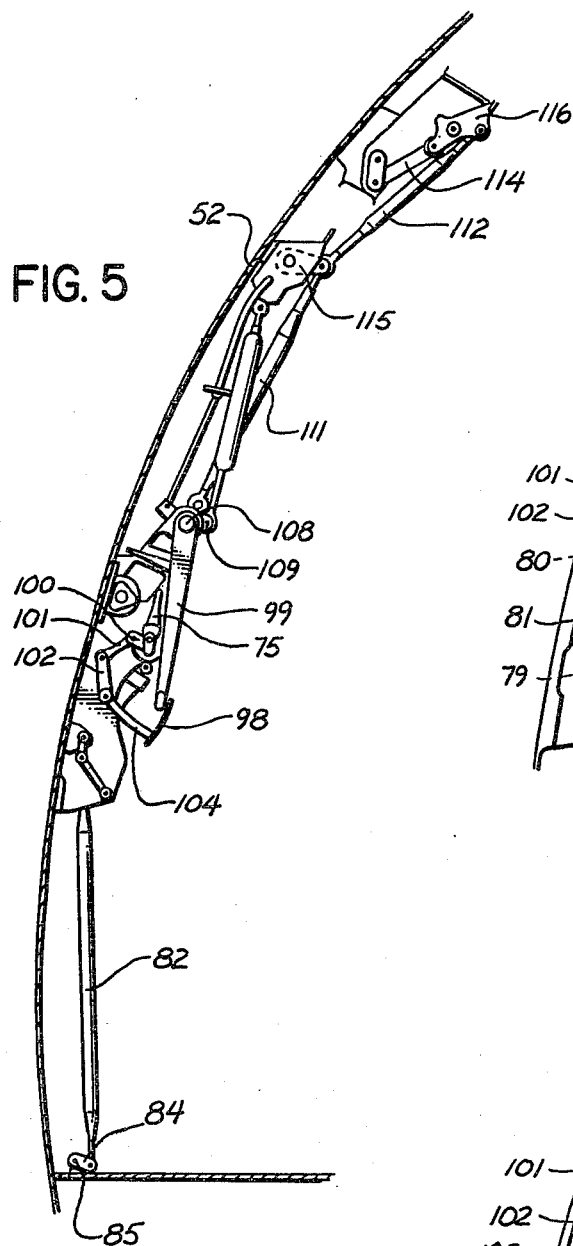
FIG. 5 is a highly simplified vertical cross-sectional view taken substantially along the line 5—5 in FIG. 1 and here illustrating the latching/unlatching mechanisms and linkages, including the interior latch handle, and the arming/disarming mechanism and linkages.
Figure 6:
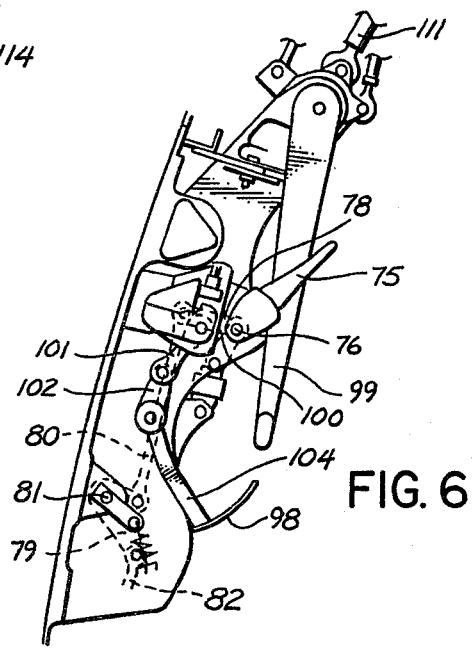
FIG. 6 is a greatly enlarged vertical sectional view of a portion of the apparatus shown in FIGS. 1 and 5, again with parts removed for purposes of clarity, here illustrating the arming lever and associated linkages in the disarmed position.
Figure 7:
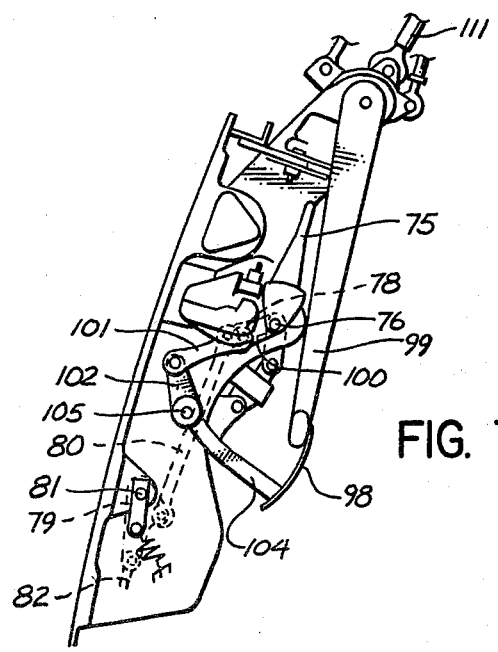
FIG. 7 is a greatly enlarged vertical section view similar to FIG. 6, but here illustrating the arming lever and associated linkages in the armed position.

Referring next to FIGS. 5 through 7 conjointly, there has been illustrated in considerably greater detail a system which is suitable for selectively arming and disarming the emergency evacuation system dependent upon the particular operating conditions encountered. More specifically, those skilled in the art will appreciate that in normal operation, the emergency evacuation system will be armed upon departure of the aircraft from the terminal departure gate; and, assuming no emergency conditions are encountered requiring opening of the doors and deployment of the escape slides, the doors will remain closed and the system will remain armed until the aircraft reaches the destination terminal arrival gate. At that point, the emergency evacuation system is disarmed. If at any time during the foregoing interval emergency conditions mandate evacuation of the aircraft, the doors will be opened while the emergency evacuation system is armed, thereby deploying the escape slides.

To permit of manual arming and disarming of the emergency evacuation system from the interior of the aircraft, an arming lever 75 (FIGS. 1, 5 and 6) is mounted in the fuselage surround structure adjacent the plug-type door 50 and in a position conveniently accessible to a crew member; the lever 75 being coupled through shaft 76 to a crank 78. Crank 78 is, in turn, coupled to an interior disarm crank 79 by a push rod 80. The interior disarm crank 79, which is pivoted to the fuselage surround structure at 81, is coupled to a second push rod 82 which extends downwardly to a point just above the passenger deck 74 where it is coupled to a girt bar actuating crank 84 (FIGS. 1 and 5), the latter being fixed to a drive shaft 85 extending horizontally into the forward fitting 72 mounted on the passenger deck 74 and which serves to house a suitable rotatable drive coupling (not shown) which couples the drive shaft 85 to a girt bar torque actuating shaft 86 passing coaxially through the girt bar carrier 88 forming part of the girt bar assembly 70, with the torque actuating shaft 86 extending into the aft fitting 71 mounted on the passenger deck 74.

The arrangement is such that when the arming lever 75 is in the inboard position as shown in FIG. 6, the emergency evacuation system is disarmed—that is, the girt bar carrier assembly 70 is removably, but positively, attached to the plug-type door 50. When the system is to be armed, the arming lever 75 is simply pushed outboard (in a counterclockwise direction as viewed in FIG. 6) from the position shown in FIG. 6 to that shown in FIG. 7. Such pivotal motion, through actuation of the cranks 78, 79, serves to urge push rods 80, 82 in a downward direction, thereby pivoting crank 84 in a clockwise direction as viewed in FIGS. 2 and 5. Such movement of crank 84 serves to rotate drive shaft 85 and, consequently, the girt bar torque actuating shaft 86.

Figure 8:
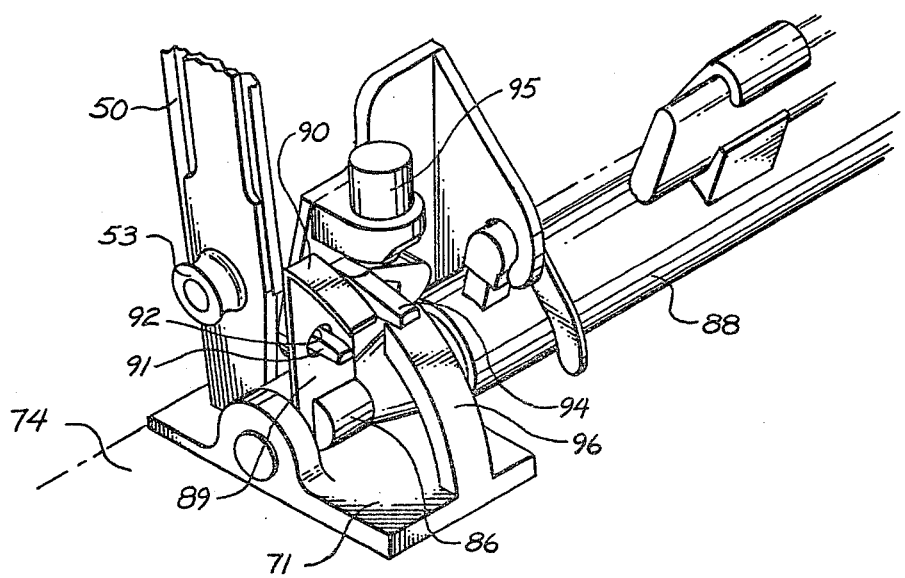
FIG. 8 is a fragmentary perspective view of the lower left inboard corner of the plug-type door shown in FIG. 1 with the door in the down or fully closed position and illustrating particularly details of the girt bar assembly as carried by the door prior to arming of the emergency evacuation system.

Referring next to FIG. 8, it will be observed that the aft end of the torque actuating shaft 86 is provided with a radially extending lift plate 89 terminating at its outboard end in a suitable carrier lock flag 90. As here shown, the system is in the disarmed condition and the lift plate 89 extends vertically upward and is supported by a lift pin 91 integral with door 50 and which extends through a lift pin hole 92 formed in the lift plate. As the ensuing description proceeds, it will be understood that the construction of the forward fitting 72 and cooperable lift components associated with the girt bar carrier assembly 70 is identical with the aft fitting 71 and lift components shown in FIG. 8 except for the fact that the forward fitting 72 includes a suitable torque drive coupling (not shown) for rotationally coupling the drive shaft 85 to the torque actuating shaft 86. Consequently, when the components are in the disarmed position shown in FIG. 8, the forward end of the girt bar carrier assembly 70 is carried by and supported on a forward lift pin (not shown, but identical to the aft lift pin 91 depicted in FIG. 8). Thus, when the plug-type door is vertically translated—up to a door open position or down to a door closed position—in the disarmed state, the girt bar carrier assembly 70 is supported on and carried by the aft and forward lift pins 91.

Figure 9:
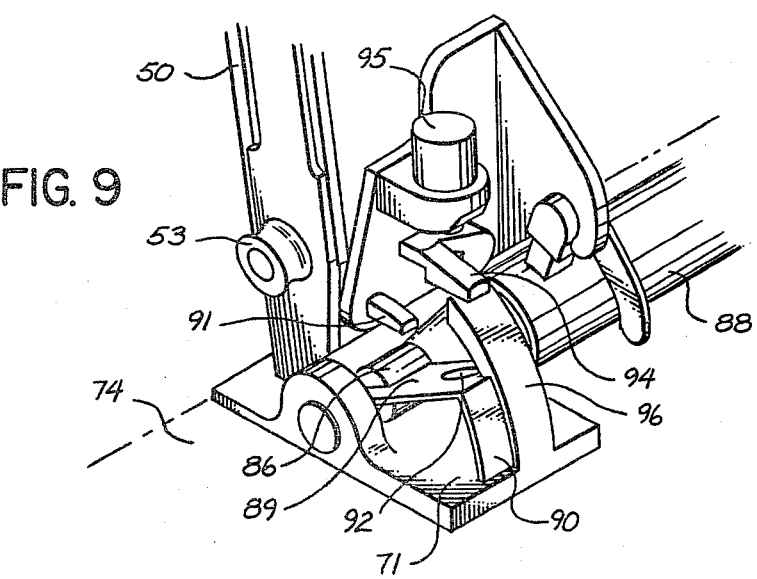
FIG. 9 is a perspective view similar to FIG. 8, but here illustrating the component parts following arming of the emergency evacuation system with the girt bar carrier assembly having been disconnected from the door and positively connected to the floor fittings on the passenger deck.

Referring next to FIG. 9, it will be appreciated that when the plug-type door is fully seated in a closed and latched condition, and the emergency evacuation system is armed in the manner previously described by movement of the arming lever 75 from the position shown in FIG. 6 to that shown in FIG. 7, the rotational movement imparted to the girt bar torque actuating shaft 86 will serve to rotate the shaft 86 in a clockwise direction as viewed in FIGS. 8 and 9, thus pivoting the aft lift plate 89 (as well as the forward lift plate, not shown) in a clockwise direction from the position shown in FIG. 8 where the lift plate is supported on lift pin 91 to the position shown in FIG. 9. In this position, the carrier lock flags 90 are in their downward armed position and provide a visual indication of such armed state through windows (not shown) formed in the fittings so as to enable the crew to readily ascertain the fact that the system is armed. In this forward armed position, the lift plates are no longer carried on, nor supported by, the lift pins 91; and, consequently, the girt bar carrier assembly 70 is no longer carried by the plug-type door 50. Rather, the configuration of the aft and forward fittings 71, 72 and the lift plates 91 on the aft and forward ends of the torque actuating shaft 86 is such that the girt bar carrier assembly 70 is now positively and rigidly attached to the passenger deck 74. Consequently, when the plug-type door 50 is opened with the emergency evacuation system armed (as shown in FIG. 9), as the door moves inwardly and upwardly, the escape slide (not shown) is withdrawn from its stowed position within the escape slide bustle 69 formed in the door (FIGS. 1-4) and is deployed outwardly through the ingress/egress opening 51 in the aircraft fuselage 52.

As thus far described, the emergency evacuation system interior arming/disarming mechanism is essentially the same as that described in greater detail in the aforesaid Fitzgerald et al. U.S. Pat. No. 4,125,235. However, in carrying out the present invention, provision is made for positively latching the girt bar carrier assembly 70 to the plug-type door 50 when the emergency evacuation system is disarmed, thereby insuring that the girt bar carrier assembly will not be accidentally dislodged from the door 50 when the system is disarmed and thus preventing inadvertent or accidental deployment of the escape slide—for example, when the system is disarmed at a terminal gate and the door is opened to permit deplaning or enplaning of passengers. To this end, and as best illustrated in FIG. 8, it will be observed that the plug-type door structure has pivotally mounted thereon a locking pawl 94 which is normally biased in a downward position by means of a spring plunger 95 with the pawl engaging the upper surface of the lift plate 89 and securely clamping the same against the lift pin 91. However, as the plug-type door 50 approaches its lowermost fully closed position, the locking pawl 94 engages an upwardly extending standard 96 integral with the fitting 71, thus serving to pivot the locking pawl upwardly against the spring bias provided by spring plunger 95. This serves to release the positive clamped interconnection between the lift plate 89 and the lift pin 91 and permits the lift plate to be rotated in the manner previously described from the disarmed position shown in FIG. 8 to the armed position shown in FIG. 9 when the emergency evacuation system is armed.

For the purpose of providing a prominent visual indication of the armed or disarmed status of the emergency evacuation system, and as best illustrated by reference to FIGS. 1, 6 and 7 conjointly, provision is made for shifting a flexible emergency warning flag 98 to a position partially overlying the interior door handle 99 when the emergency evacuation system is armed. To accomplish this, the arming lever 75 is connected through a series of cranks 100. 101 and 102 to a pivoted support arm 104 carrying the emergency warning flag 98 at its inboard end. Thus, when the arming lever 75 is in the disarmed position shown in FIG. 6, the emergency warning flag 98 is retracted. However, when the arming lever 75 is moved to the armed positon shown in FIG. 7, motion is transmitted through cranks 100, 101 and 102 to cause the arm 104 to move in a counterclockwise direction about its pivot point 105 and thus raising the flexible emergency warning flag 98 to the position shown in FIG. 7 where the upper end of the flag engages the handle portion of the interior door handle 99 so as to provide a prominent indication to anyone contemplating opening of the door by movement of the handle 99 that the system is armed. If, however, the door is to be opened in the armed state because of a desire to deploy the emergency evacuation escape slide, the interior door handle 99 can be grapsed and moved inboard in a counterclockwise direction as viewed in FIG. 7 so as to open the door with the flexible emergency warning flag 98 simply being flexed out of the way without disarming the system.

Interior Door Latching/Unlatching Mechanism

To permit the plug-type door 50 to be latched and unlatched from the passenger cabin in the interior of the aircraft, an interior door actuating mechanism, generally indicated at 106 in FIGS. 1, 2 and 10, is provided which is structurally and functionally similar to that described in greater detail in the aforesaid Fitzgerald et al. U.S. Pat. No. 4,125,235 except for the fact that interior door latching/unlatching mechanism 106 is totally independent of the exterior door latching/unlatching mechanism to be hereinafter described. Therefore, those interested in specific structural and operational details of common portions of the interior door latching/unlatching mechanism 106 are referred to U.S. Pat. No. 4,125,235. However, to facilitate an understanding of the present invention, the general construction and operation of the interior door actuating mechanism 106 and associated linkage will be briefly described below.

Figure 13:
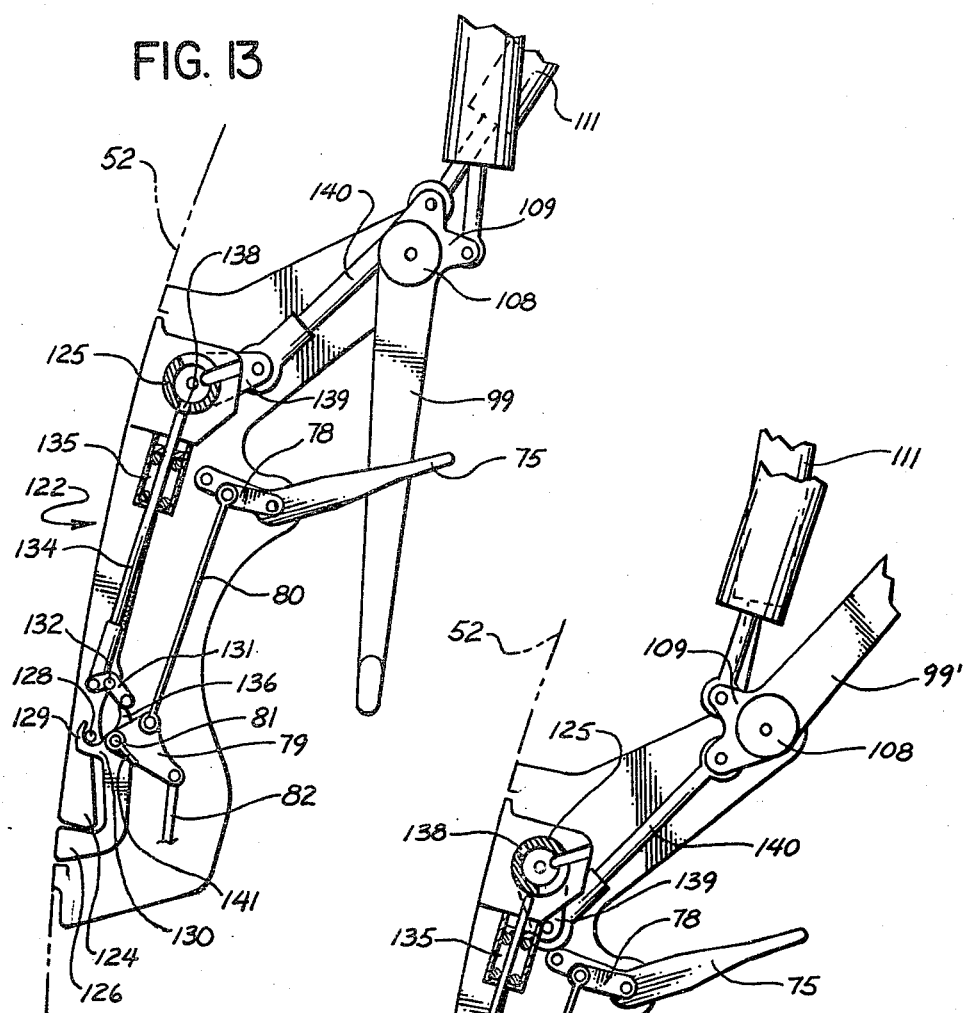
FIG. 13 is a greatly enlarged fragmentary vertical cross-sectional view taken substantially along the line 13—13 in FIG. 1, but here depicting the actuating mechanism with the door closed and latched, and the emergency evacuation system disarmed.
Figure 14:
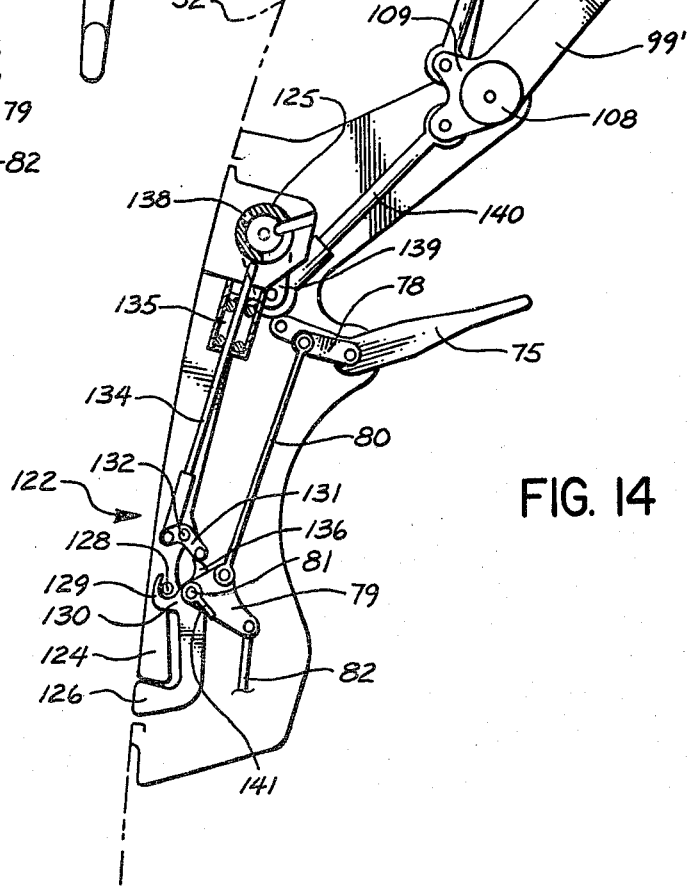
FIG. 14 is a vertical cross-sectional view similar to FIG. 13, but here illustrating the actuating mechanism with the door unlatched by virtue of inward and upward movement of the interior door handle.

Thus, referring to FIGS. 1, 2 and 10-14 conjointly, and assuming that the plug-type door 50 is in the fully closed and latched state, when the crew member wishes to unlatch the door preparatory to opening thereof, it is merely necessary to grab the interior door handle 99 and pivot it inboard (counterclockwise as viewed in FIGS. 2, 10 and 13) from the down and latched position there shown inwardly and upwardly to the unlatched position indicated at 99' in FIGS. 10 and 14 with the interior door handle pivoting about its pivot shaft 108. As depicted in FIGS. 13 and 14, such unlatching movement has been shown with the arming lever 75 in the disarm position; but, actuation of the door actuating mechanism 106 and its associated linkages will be identical irrespective of whether the emergency evacuation system is armed or disarmed—that is, the plug-type door 50 can be opened with equal facility from the interior of the aircraft irrespective of whether the emergency evacuation system is armed or disarmed. Movement of the interior door handle 99 from the position shown in FIG. 13 to that shown at 99' in FIG. 14 serves to drive crank 109 in a counterclockwise direction as viewed in the drawings and serves to rotate a latch cam actuating shaft 110 (FIGS. 1, 2, 11 and 12) through a series of push rods 111, 112 and 114, cranks 109 and 115, and an overcenter crank 116.

As best illustrated by reference to FIGS. 11 and 12, movement of the interior door handle 99 to the door unlatched position in the manner previously described serves to rotate the latch cam actuating shaft 110 in a counterclockwise direction from the door latched position shown in FIG. 11 to the door unlatched position shown in FIG. 12; and, such motion serves to rotate a generally inverted C-shaped latch cam 118 from the door latched position (FIG. 11) in a counterclockwise direction to the door unlatched position (FIG. 12). As here illustrated, when in the door latched position (FIG. 11), the C-shaped latch cam 118 serves to capture a latch pin 119 formed on trolley 58, thereby preventing translation of the trolley 58 along upper track 60 and thus precluding unlatching and opening of the plug-type door 50. However, when the interior door handle 99 is manually shifted to the unlatched position as described above and illustrated in FIG. 14, counterclockwise rotational movement of the C-shaped latch cam 118 releases the latch pin 119 and permits the trolley 58 to translate vertically along upper track 60.

In keeping with the preferred form of the invention, the system components and forces are preferably balanced such that the plug-type door 50 generally occupies a null balanced position where it is slightly ajar—for example, in a slightly open position such as that shown in FIG. 4. As a consequence of such design, as the latch cam 118 rotates in a counterclockwise direction from the latched position shown in FIG. 11 to the unlatched position shown in FIG. 12, the plug-type door 50 tends to move slightly inboard and upwardly from the fully closed and latched position (FIG. 3) to a position wherein the door is slightly ajar (FIG. 4), normally without requiring any imposition of driving forces by the latch cam 118. Consequently, when the door reaches the unlatched null balance position, the trolley 58 will be in a position similar to that illustrated in FIG. 12, but with the latch pin 119 still located within the now upwardly presented C-shaped opening in the latch cam 118, thereby permitting the crew member to manually raise the door 50 in the manner previously described. In some instances, however, it is possible that during door unlatching, the plug-type door 50 may tend to stick in the fully closed latched position—for example, when the door is iced closed. In those instances, a cam actuating arm 120 on the outer side of the latch cam 118 serves to engage latch pin 119 on trolley 58 and drivingly shift the door from its fully closed position to the slightly open null balance position shown in FIG. 4.

When it is desired to close and latch the plug-type door 50, the operation of the actuating mechanism 106 and associated linkages are reversed. Thus, the crew member will first grasp the fully opened plug-type door 50 and pull it downwardly into its null balance position with the latch pin 119 on trolley 58 received within the upwardly presented C-shaped opening in the C-shaped latch cam 118 (Cf., FIG. 12). At that point, the operator grasps the interior door handle 99 (which is now in the raised unlatched position shown at 99' in FIGS. 10 and 14) and pivots the door handle in the opposite direction (i.e., clockwise as viewed in FIGS. 10 and 14) so as to cause a second cam actuating arm 121 on the inboard side of C-shaped latch cam 118 to drivingly engage the latch pin 119 on trolley 58 and urge such trolley downwardly and outwardly along track 60, 61 until the plug-type door 50 is in the fully closed and latched position shown in FIG. 3 with the C-shaped latch cam 118 and trolley 58 in the door latched position shown in FIG. 11.

Exterior Door Latching/Unlatching Mechanism

In keeping with one of the important aspects of the present invention, provision is made for enabling latching and unlatching of the plug-type door 50 from the exterior of the aircraft irrespective of whether the emergency evacuation system is armed or disarmed; but, in those instances where the emergency evacuation system is armed, for initially, positively and automatically disarming the same preparatory to unlatching and opening of the door. Considering first the case where the emergency evacuation system has been disarmed from the interior of the aircraft in the manner previously described, and referring particularly to FIGS. 13 and 15 conjointly—it is to be understood that the ensuing operational description assumes that the arming lever 75 is in the disarmed position shown in FIG. 13 and in solid lines in FIG. 15—it will be noted that the external door latching/unlatching mechanism, generally indicated at 122, includes an external door handle 124 mounted on shaft 125 journaled for rotation in the fuselage surround structure. As here shown, the external door handle 124 is flush-mounted within an opening in the exterior skin surface of the fuselage surround structure so as to provide a smooth, continuous, substantially uninterrupted external aerodynamic surface. However, as shown in FIG. 13, the external door handle 124, while mounted on shaft 125, is not, under normal operating conditions, drivingly coupled thereto. Consequently, when the plug-type door 50 is unlatched from the interior of the aircraft, the shaft 125 simply rotates within the relative to the external door handle 124 which remains in its stowed flush inoperative position as shown in FIG. 13.

Figure 15:
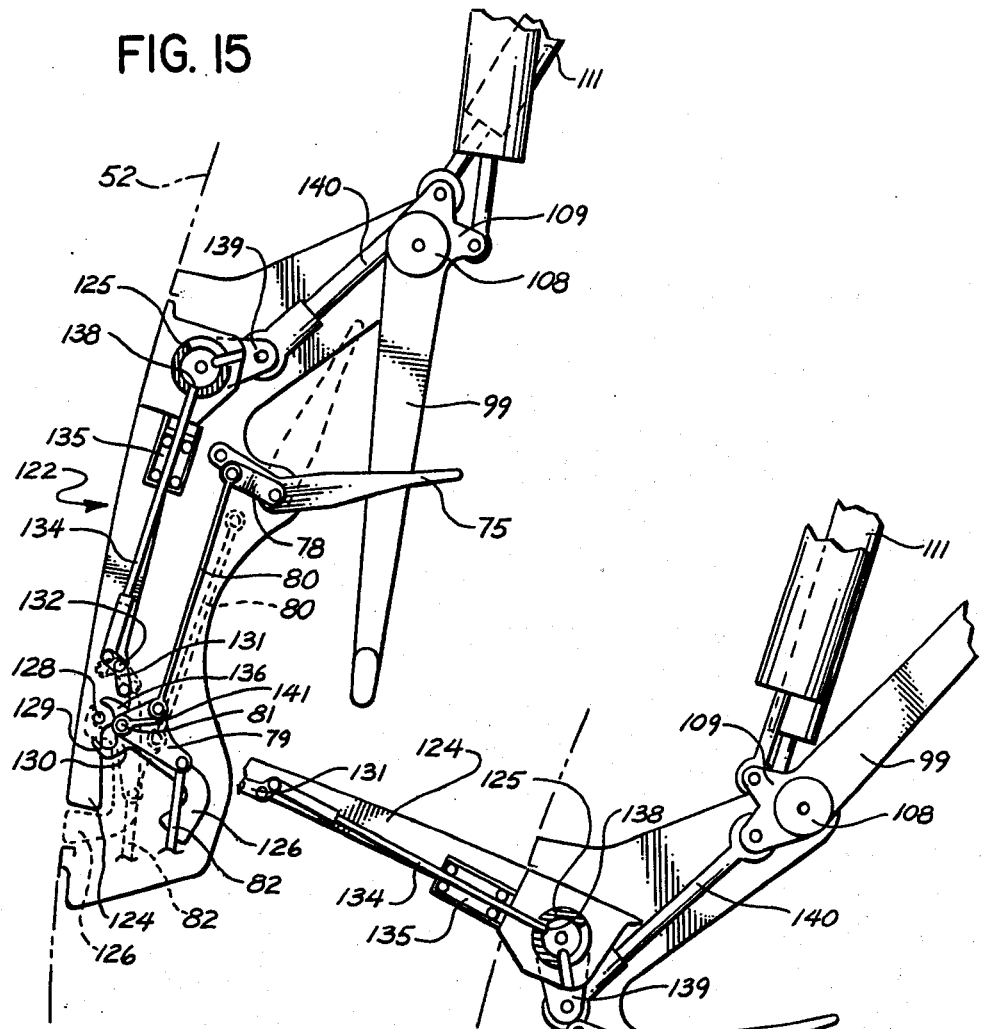
FIG. 15 is an enlarged vertical cross-sectional view similar to FIG. 13, but here illustrating the actuating mechanisms with the arming lever and associated linkage for the emergency evacuation system shown in phantom lines in the armed state and in the solid line positions occupied during the initial stages of door unlatching from the exterior of the aircraft, at which time the arming linkage and, therefore, the arming lever, is shifted to the disarmed state.

In order to unlatch the plug-type door 50 from the exterior of the aircraft, the airport terminal attendant or other person grasps the lower end of the exterior door handle 124 by inserting his or her fingers beneath the handle and pushing inwardly on an external release/disarm lever 126, causing the lever to pivot about its pivot point 81 (the same pivot point previously described in connection with the internal disarm crank 79 shown in FIGS. 6 and 7) and which is formed on the fuselage surround structure with the lever 126 pivoting in a counterclockwise direction as viewed in the drawings from the flush non-active position shown in FIG. 13 to the depressed active position shown in solid lines in FIG. 15. Such pivotal movement of the release/disarm lever 126 serves to: (i) release a latch pin 128 integral with the exterior door handle 124 and which is received within, and initially held captive by, a latch arm 129 on an inverted C-shaped latch cam 130 formed at the inboard end of the release/disarm lever 126; and (ii), to release a spring biased bell crank 131 pivotally mounted at 132 on the exterior door handle 124 to permit establishment of an operative driving connection between the exterior door handle 124 and shaft 125, thereby operatively associating the exterior door handle 124 with the interior door actuating mechanism 106 (FIG. 10).

Figure 16:
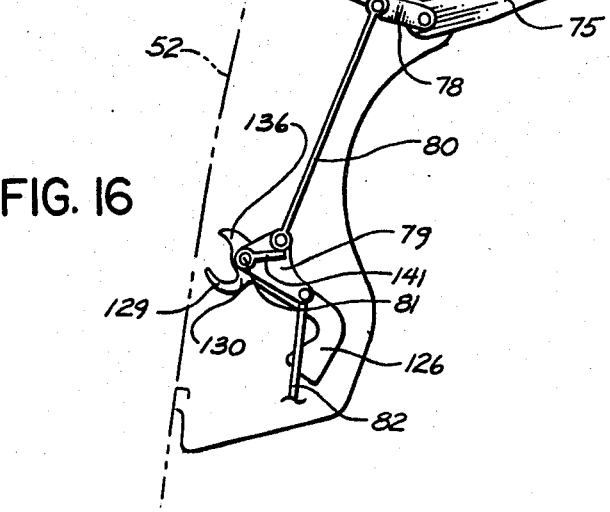
FIG. 16 is a greatly enlarged fragmentary vertical sectional view similar to FIGS. 13 through 15, but here illustrating the actuating mechanism in the door unlatched state as a result of pivoting of the exterior door handle from its normal inoperative stowed position flush with the outer skin on the fuselage to a position substantially normal to the fuselage.

Thus, referring first to FIG. 13, it will be noted that prior to depression of the release/disarm lever 126, exterior door handle 124 is latched in a flush inoperative position by engagement of latch pin 128 on the handle assembly with latch arm 129 on the C-shaped latch cam 130 at the inboard end of lever 126. However, upon depression of the release/disarm lever 126 and shifting thereof to the position illustrated in FIG. 15, the latch pin 128 is released and the operator may freely pivot the exterior door handle 124 outwardly from its flush stowed position (FIGS. 13 and 15) to an operative position (FIG. 16). At the same time that the exterior door handle 124 is unlatched, but prior to outward pivotal movement thereof by the operator, an elongate latch pin 134 carried by the handle 124 and pivotally connected at its lower end to bell crank 131 is permitted to move upwardly under the influence of a bias spring 135 since the bell crank 131 is no longer engaged with a second latch arm 136 formed on the C-shaped latch cam 130 at the inboard end of the release/disarm lever 126. As the elongate lock pin 134 advances under the influence of bias spring 135, its upper end moves into a latch hole 138 formed in shaft 125, thereby establishing a positive mechanical direct drive connection between the exterior door handle 124 and the shaft 125. As a consequence, when shaft 125 rotates as a result of movement of the exterior door handle 124 from the position shown in FIG. 15 to that shown in FIG. 16, such motion is transmitted to the interior actuating mechanism 106 via crank 139 on shaft 125 and link 140 pivotally connected at its outboard end to crank 139 and at its inboard end to crank 109. Thus, movement of the exterior door handle 124 from the flush stowed position shown in FIG. 15 to the operative position shown in FIG. 16 causes link 140 to move downwardly and outwardly, thus pivoting crank 109 in a counterclockwise direction as viewed in the drawings from the position shown in FIG. 15 to the position shown in FIG. 16 with the movement of crank 109 being identical to that previously described and resulting from movement of the interior door handle 99 from the position shown in FIG. 13 to that shown in FIG. 14. Indeed, when the exterior door handle 124 is rendered operative in the manner described above, both the exterior door handle and the interior door handle 99 will be simultaneously and positively coupled to crank 109; and, therefore, the two door handles will be slaved together and actuation of the external door handle 124 by an attendant or individual outside of the aircraft will result in simultaneous operation of the interior door handle 99.

Considering next the case where a terminal flight attendant or other individual initiates unlatching of the plug-type door 50 from outside the aircraft when the emergency evacuation system is armed, and as best illustrated by reference to FIG. 15, it will be noted that the release/disarm lever 126 serves to initiate a third important function when it is pushed inwardly to the position shown in FIG. 15 by such attendant or other individual—viz., actuation of the lever 126 serves to automatically disarm the emergency evacuation system from the exterior of the aircraft immediately upon depression of the lever 126 and prior to actuation of the exterior operating handle 124. Thus, as shown in FIG. 15 in phantom lines, the arming lever 75 and its associated linkage including cranks 78 and 79 and push rods 80 and 82 are assumed to be initially in the armed position with the arming lever 75 in its uppermost position and the crank 79 and push rods 80, 82 in their lowermost positions. For the purpose of shifting the arming mechanism to the disarmed solid line position shown, shaft 81 has keyed thereto for rotation therewith an exterior disarm crank 141 which is moved simultaneously and in the same direction about the pivot point defined by shaft 81 when the release/disarm lever 126 is actuated. Thus, inward depression of lever 126 in a counterclockwise direction on shaft 81 from the dotted line position shown in FIG. 15 to the solid line position there shown is accompanied by simultaneous counterclockwise rotation of the exterior disarm crank 141. That crank serves to engage the pivotal interconnection between push rod 80 and crank 79, thereby urging push rod 80 in an upward direction as viewed in the drawings. Such action causes the arming lever 75 to move in a clockwise direction from the dotted line armed position to the solid disarmed position; and, of course, also results in upward movement of push rod 82 associated with the arm/disarm mechanism so as to disarm the emergency evacuation system in the same fashion as occurs when a crew member moves the disarm lever 75 itself. However, in this instance, disarming results from forces imposed on crank 79 and push rod 80, rather than by manual manipulation of the arming lever 75 itself.

Thus, it will be appreciated that the present invention readily permits of unlatching and relatching of the plug-type door from the interior of the aircraft irrespective of whether the emergency evacuation system is armed or disarmed, but without causing any deployment or outward movement of the exterior door handle 124; thereby insuring that escape slides may be deployed without incurring any risk of damage thereto because of a deployed or outwardly pivoted exterior door handle. At the same time, however, the invention readily permits the door 50 to be unlatched from the exterior of the aircraft, again without regard to whether the emergency evacuation system is armed or disarmed. But, in this latter instance, when one attempts to open the door from the exterior of the aircraft, he or she must first depress the release/disarm lever 126 which, among other important functions previously described, automatically disarms the emergency evacuation system. It will further be appreciated upon inspection of FIG. 15 that the disarming action provided by exterior disarm crank 141 is a unidirectional action. That is, movement of the crank 141 in a counterclockwise direction as viewed in FIG. 15 is totally ineffective if the emergency evacuation system is initially disarmed, but is effective in the manner described above to disarm an armed system through driving engagement with the arm/disarm linkage. On the other hand, movement of the lever 126 in a clockwise direction as viewed in FIG. 15 is not effective to alter the disarmed status of the emergency evacuation system since disarm crank 141 simply moves away from such linkage during clockwise movement. Consequently, it is impossible with the present invention for an individual located outside of the aircraft to either deliberately or inadvertently arm the emergency escapement system.

Secondary Positive Door Latching Assembly

Figure 17:
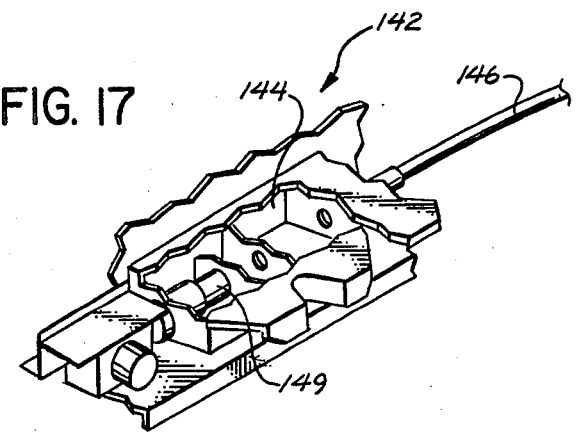
FIG. 17 is a fragmentary perspective view illustrating details of the secondary positive latching mechanism employed for latching the plug-type door in the fully closed position with the mechanism here being depicted in the door open position.
Figure 18:
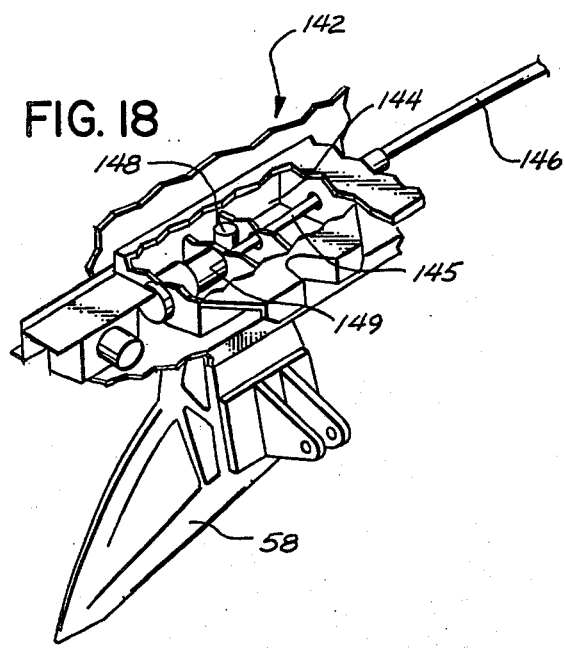
FIG. 18 is a fragmentary perspective view similar to FIG. 17, but here illustrating the position of the latching mechanism when the door is closed and locked.

In keeping with the positive mechanical door latching aspects of the present invention, provision is made for positively and mechanically latching the plug-type door 50 in the fully closed latched position utilizing a secondary mechanical latching assembly which: (i) serves to electrically activate a remote visual or auditory cockpit warning system to alert the pilot and crew as to whether the door is latched or unlatched; (ii) is readily visible from the interior of the passenger cabin so that the pilot or other crew member can visually determine whether the door is, or is not, in fact latched should the remote cockpit warning system provide an electrically generated warning that such door is unlatched—thereby minimizing flight delays attributable to electrical malfunctions in the electrical warning system; and (iii), absorbs loads that would otherwise be applied to the mechanisms shown in FIGS. 11 and 12 when the plug-type door 50 is fully closed and latched. To this end, and as best observed with reference to FIGS. 1, 11, 17 and 18 conjointly, it will be noted that a secondary latching mechanism, generally indicated at 142, is mounted in the fuselage surround structure immediately above the ingress/egress opening 51 and centrally with respect to a vertical plane passing through the upper track 60 and trolley 58. As best illustrated in FIGS. 17 and 18, the secondary latching mechanism 142 includes a clevis fitting 144 adapted to receive the free end 145 (FIG. 18) of a conventional push-pull cable 146. The conventional push-pull cable 146 is coupled to actuating shaft 108 (FIG. 1) and arranged so that during the final increment of downward travel of interior door handle 99 (whether resulting from manual manipulation of the handle 99 from inside the aircraft or operation of the exterior handle 124), the free end 145 of the push-pull cable 146 enters and passes through the clevis fitting 144. Conversely, during initial unlatching movement of the interior door handle 99 (again irrespective of whether resulting from manual manipulation of the interior door handle or the exterior door handle 124), the free end 145 of push-pull cable 146 is retracted from the clevis fitting 144.

In operation, as the plug-type door 50 is, for example, closed and latched in the manner previously described, a guide roller 148 (FIGS. 11 and 18) mounted on the upper edge of the door 50, moves into the clevis fitting 144 as the trolley 58 advances to its fully seated and latched position as illustrated in FIG. 11. The final increment of pivotal movement of the inner door handle 99 then causes actuation of the push-pull cable 146, causing the free end 145 thereof to pass laterally through the clevis fitting 144 inboard of the guide roller 148; and, thereby capturing the roller 148 and positively latching the door 50 closed with a secondary mechanical latch. This arrangement is further advantageous in that loading forces are now imposed on the secondary latch mechanism 142 rather than on the latch cam 118 and related components shown in FIGS. 11 and 12. Moreover, as the free end 145 of the push-pull cable 146 is fully advanced, it engages and activates a limit switch 149 which serves to complete a remote warning circuit indicating that the door is fully closed and latched. Unfortunately, but consistent with airline demands for manually operated actuating systems, such electrical warning systems are prone to electrical malfunction—for example, resulting from a defective limit switch—which can produce a faulty unlatch warning signal at the remote cockpit location even though the door 50 may, in fact, be fully closed and latched. However, the present invention obviates this potential problem simply and effectively by including a suitable inspection port (not shown) in the upper door panel, thereby permitting the pilot or other crew member to visually examine the secondary latch mechanism 142 whenever an unlatch signal occurs for the purpose of verifying whether the door 50 is properly latched with the guide roller 148 held captive or whether the warning signal is accurate and the door is not latched.

Up-Latch Safety Mechanism

Figure 19:
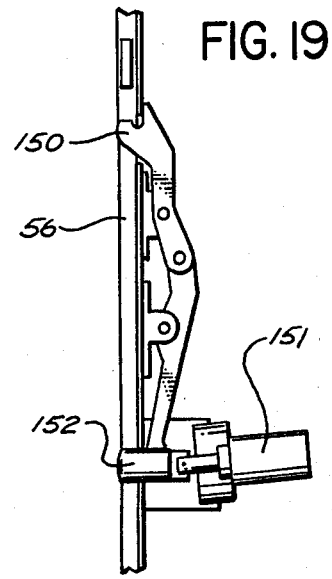
FIG. 19 is a vertical sectional view taken substantially along the line 19—19 in FIG. 3, but with parts removed for purposes of clarity, and here illustrating an up-latch mechanism for maintaining the plug-type door in its fully opened state—i.e., in the up position.

In keeping with yet another aspect of the invention, provision is made for automatically latching the plug-type door in its uppermost fully operative position so as to preclude accidental or inadvertent door closure—for example, in the case of failure of the counterbalance cable 64 (FIG. 2) or disassembly of the counterbalance system 62 for maintenance purposes. To accomplish this, an up-latch locking pawl 150 (FIG. 19) is mounted in the fuselage surround structure in such a manner as to normally project into one of the lower tracks 55, 56—here, into the forward track 56. Pawl 150 is preferably shaped such that the lower door roller 54 (FIG. 1) riding in track 56 can freely move past the pawl and up along the track simply by camming the pawl 150 out of the track (to the right as viewed in the drawings) from the position shown in FIG. 19 to that shown in FIG. 20. After upward passage of the door roller 54, the pawl 150 automatically resumes the position shown in FIG. 19 under a suitable biasing force provided, for example, by an electrically controlled solenoid 151 or a conventional spring biasing means or the like (not shown). In this condition, the door roller 54 is precluded from downward movement within track 56, thus affirmatively latching the door 50 in the up position.

Figure 20:
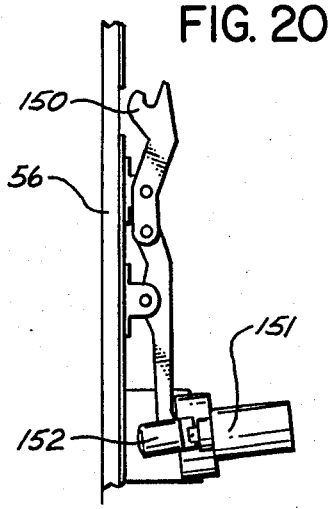
FIG. 20 is a sectional view similar to FIG. 19, but here illustrating the door up-latch mechanism in the released state permitting downward manual movement of the door; and, FIG. 21 is a sectional view taken substantially along the line 21—21 in FIG. 1, here depicting details of the door sealing mechanism and the continuous door stops provided for transmission of pressure loads.

To release the door, it is necessary to deliberately and manually depress a release button 152 (or to depress the button through the use of solenoid 151) as shown in FIG. 20, thereby retracting the pawl 150 and permitting closure of the door. As a further safety feature, the pawl 150 may be readily designed such that it cannot be retracted if the door roller 54 is engaged therewith unless and until the door 50 is manually raised sufficiently far as to disengage the door roller 54 and pawl 150.

Door Sealing And Distribution Of Pressure Loads

Figure 21:
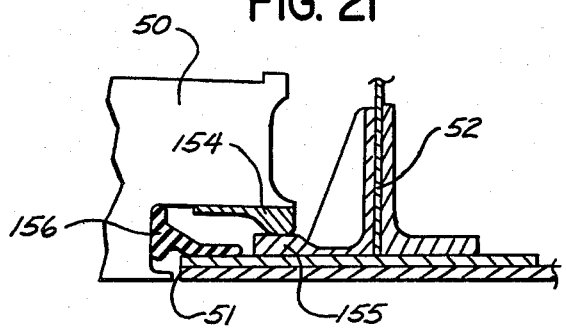

Referring to FIG. 21, there has been illustrated a door sealing arrangement which permits of effective transmission of pressure loads to the fuselage surround structure 52. Thus, because essentially all actuating mechanisms for the door latch/unlatch system and the emergency evacuation arm/disarm system are located externally of the plug-type door 50, it is possible to form the door utilizing essentially only transverse beams, edge members, and an outer skin as contrasted with the more highly complex egg-crate constructions typical of plug-doors in conventional large commercial aircraft. This readily enables the door edge members to be machined to close tolerances, thereby permitting use of continuous mutually engageable vertical door stops 154, 155 respectively mounted on both vertical door edges and both adjacent vertical edges of the fuselage surround structure; whereas prior complex door constructions did not permit maintenance of close tolerances and, consequently, required discrete multiple door stops along each vertical door edge. Such discrete multiple door stops have tended to crack and have been extremely difficult to adjust so as to uniformly distribute pressure loads evenly and equally up and down the door. The present invention, however, permits of use of continuous vertical door stops 154, 155 machined to close tolerances and has proved highly effective in distribution of pressure loads during extensive life cycle testing. A suitable resilient flexible sealing member 156 is secured to the door edge so as to effectively seal the ingress/egress opening 51 in the aircraft fuselage when the door 50 is closed.

I claim:

1. An actuating mechanism for plug-type aircraft doors of the type adapted to be mounted in an ingress/egress opening formed in the aircraft fuselage and where said aircraft includes an interior cabin floor, means for mounting said door on said fuselage with freedom for vertical translational movement generally along a path conforming to the interior fuselage contour and for lateral translational movement adjacent the bottom of said path so as to permit said door to move downwardly and outboard into said ingress/egress fuselage opening during door closure and inboard and upwardly out of said ingress/egress fuselage opening during door opening, and locking means for holding said door in said closed position, said actuating mechanism comprising:

(a) an interior door handle mounted on said fuselage adjacent said ingress/egress opening for swinging movement in a plane normal to said fuselage between first and second positions, said interior door handle being operably associated with said locking means to respectively lock and unlock said door upon movement of said interior door handle between said first and second positions;

(b) an exterior door handle mounted on said fuselage in a position normally flush with the exterior surface of said fuselage, said exterior door handle being mounted for swinging movement in a plane normal to said fuselage between first and second positions and being normally disassociated with said interior door handle and said locking means so that said interior door handle may be manipulated from inside said aircraft and between said first and second positions without causing movement of said exterior door handle; and, (c) means mounted on and accessible only from the exterior of said aircraft for coupling said exterior door handle to said interior door handle so that manipulation of said exterior door handle from the exterior of said aircraft in a plane normal to said fuselage causes simultaneous swinging movement of said interior door handle in a plane normal to said fuselage and in a direction opposite to the movement of said exterior door handle for respectively locking and unlocking said door upon movement of said exterior door handle between said first and second positions.

2. An actuating mechanism for plug-type aircraft doors of the type adapted to be mounted in an ingress/egress opening formed in the aircraft fuselage and where said aircraft includes an interior cabin floor, means for mounting said door on said fuselage with freedom for vertical translational movement generally along a path conforming to the interior fuselage contour and for lateral translational movement adjacent the bottom of said path so as to permit said door to move downwardly and outboard into said ingress/egress fuselage opening during door closure and inboard and upwardly out of said ingress/egress fuselage opening during door opening, locking means for holding said door in said closed position, an escape slide normally attached to said door when disarmed, coupling means for releasing said slide from said door and for attaching said slide to said floor for deployment through said ingress/egress opening when armed, and means for arming and disarming said slide, said actuating mechanism comprising:

(a) an interior door handle mounted on said fuselage adjacent said ingress/egress opening for swinging in a plane normal to said fuselage movement between first and second positions, said interior door handle being operably associated with said locking means to respectively lock and unlock said door upon movement of said interior door handle between said first and second positions;

(b) an exterior door handle mounted on said fuselage in a position normally flush with the exterior surface of said fuselage, said exterior door handle being mounted for swinging movement in a plane normal to said fuselage between first and second positions and being normally disassociated with said interior door handle and said locking means so that said interior door handle may be manipulated from inside said aircraft and between said first and second positions without causing movement of said exterior door handle;

(c) means mounted on and accessible only from the exterior of said aircraft for coupling said exterior door handle to said interior door handle so that manipulation of said exterior door handle from the exterior of said aircraft in a plane normal to said fuselage causes simultaneous swinging movement of said interior door handle in a plane normal to said fuselage and in a direction opposite to the movement of said exterior door handle for respectively locking and unlocking said door upon movement of said exterior door handle between said first and second positions; and, (d) means mounted on and accessible only from the exterior of said aircraft for automatically disarming said escape slide whenever said means for coupling said interior and exterior door handles is activated so as to insure that said escape slide is disarmed when said door is opened from the exterior of said aircraft.

3. An actuating mechanism as set forth in claim 2 further comprising means for affixing and positively locking said escape slide to said door when said escape slide is disarmed.

4. An actuating mechanism as set forth in claims 1 or 2 further comprising a secondary mechanical locking means for automatically locking said door directly to said aircraft fuselage upon full closure of said door.

5. An actuating mechanism as set forth in claims 1 or 2 further comprising a secondary mechanical locking means for automatically locking said door directly to said aircraft fuselage upon full closure of said door, a remote warning system, and means for activating said remote warning system for alerting the crew of said aircraft when said secondary mechanical locking means is unlocked, said secondary mechanical locking means being readily visible from the interior of said aircraft for purposes of verifying the accuracy of a remote unlocked warning signal.

6. An actuating mechanism as set forth in claims 1 or 2 wherein all acuating mechanism components are mounted exterior of said door and permitting said door to be constructed of essentially only transverse beams, edge members, and an outer skin, whereby said edge means may be precisely machined to controlled uniform close tolerances, and continuous vertical door stops mounted on said vertical door edge members and on said fuselage adjacent said ingress/egress opening for mutual engagement when said door is closed for permitting uniform transmission of pressure loads to said aircraft fuselage over the entire vertical extent of said door.

7. An actuating mechanism as set forth in claims 1 or 2 further comprising an up-latch locking means for automatically and positively latching said door in the up position when said door is opened, and manually operable release means for releasing said up-latch locking means when said door is to be deliberately closed, said manually operable release means being inoperative when said door is engaged with said up-latch locking means whereby said door must be manually raised and disengaged from said up-latch locking means in order to permit operation of said manually operable release means.

* * * * *